June 19, 1962 — R. K. McBERTY — 3,039,189
HYDRAULICALLY OPERATED PRUNING TOOL
Filed Aug. 24, 1961
2 Sheets-Sheet 1
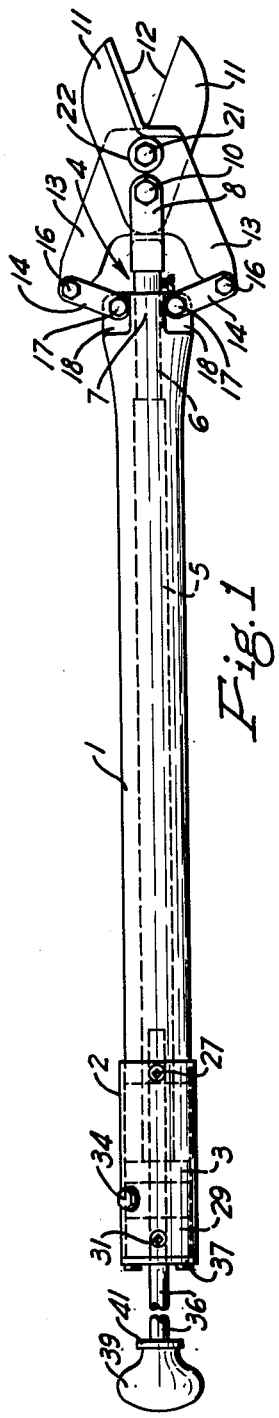
Fig. 1
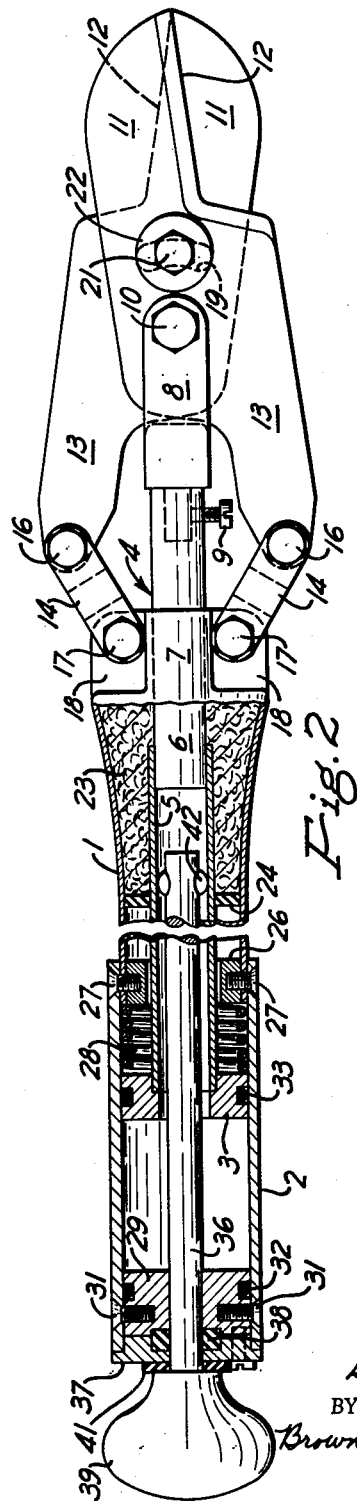
Fig. 2
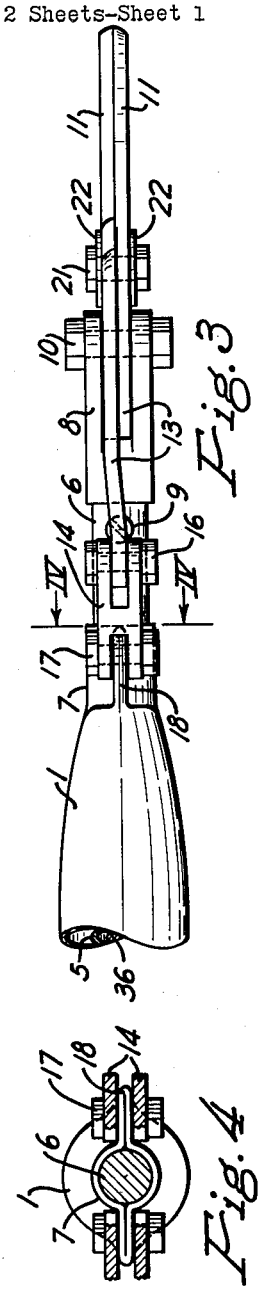
Fig. 3
Fig. 4
INVENTOR.
ROBERT K. McBERTY
BY
Brown, Critchlow, Flick & Peckham
ATTORNEYS

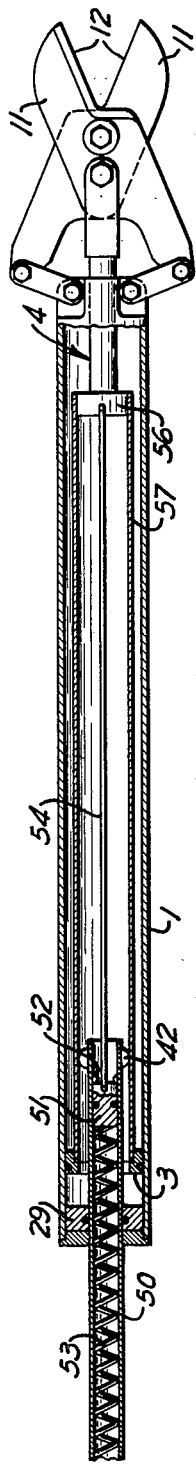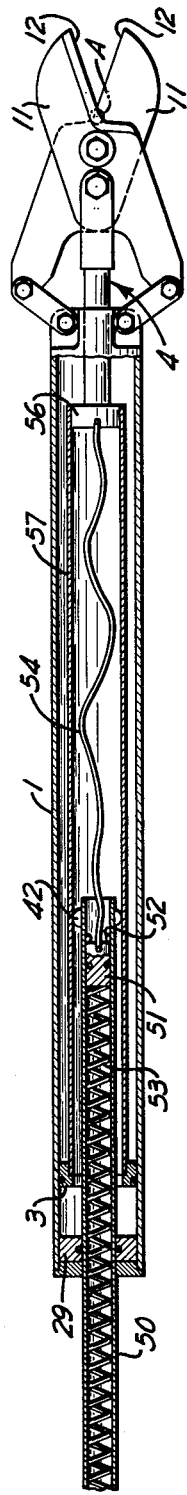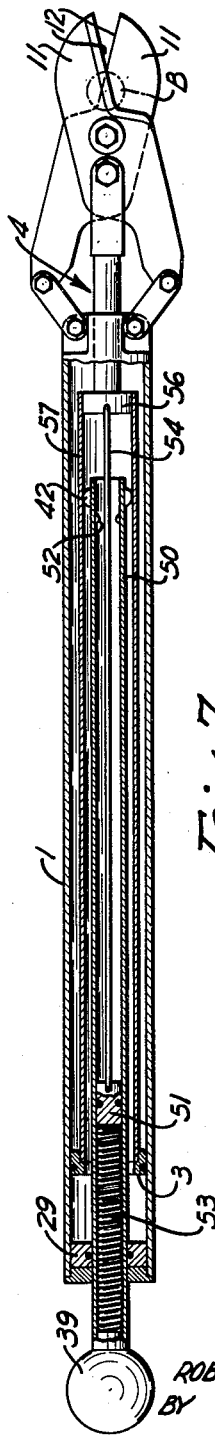
INVENTOR.
ROBERT K. McBERTY
BY
Brown, Critchlow, Flick & Peckham
ATTORNEYS 3,039,189
HYDRAULICALLY OPERATED PRUNING TOOL
Robert K. McBerty, P.O. Box 90, Rockbridge, Ohio
Filed Aug. 24, 1961, Ser. No. 133,587
8 Claims. (Cl. 30—245)

This invention relates to a hydraulically operated pruning tool and more particularly to such a tool, in which the cutting jaws are designed to have a maximum cutting effect; in which the tool will be of light weight and proper balance, and in which the hydraulic and linkage systems will provide a large mechanical advantage that will permit the cutting of heavy stems and branches with relatively little effort.

The novel features and other objects of this invention will be apparent from the following description of its preferred embodiments, together with the accompanying drawings, in which:

FIG. 1 is a front elevation of the tool with the jaws in their open position;

FIG. 2 is a fragmentary view, partly in section and somewhat enlarged, of the tool shown in FIG. 1 with the jaws in their closed position;

FIG. 3 is a side elevation of the upper portion of the tool shown in FIG. 2;

FIG. 4 is a horizontal cross section along the line IV—IV of FIG. 3;

FIG. 5 is a front elevation, partly in section, of a modified form of the tool, showing the operative positions of the parts when the cutting jaws are fully open;

FIG. 6 is similar to FIG. 5, but shows the positions of the parts when the jaws are partly closed to sever a small branch; and FIG. 7 is similar to FIGS. 5 and 6, but shows the positions of the parts when the jaws have closed still further to sever a larger branch.

In accordance with this invention, the pruning shears comprise a tubular handle of desired length, in which is slidably received a piston rod member that extends beyond the upper end of the handle. The upper portion of this member is preferably solid, while the lower portion is tubular. A pair of crossed pruning jaws are pivotally mounted on the upper end of the piston rod member. These jaws preferably have straight cutting edges forming a V when the jaws are open and have integral arms that are in substantial longitudinal alignment with the cutting edges. The lower ends of these arms are connected to the handle by pivoted links. The lower end of the handle includes a hydraulic cylinder, in which is slidably received a piston. This piston has a central opening that is connected to the lower, tubular end of the piston rod member, so that the cylinder and the tubular portion of the piston rod member define a sealed fluid reservoir. A plunger rod extends through the lower end of the cylinder in sealing engagement therewith and into the tubular portion of the piston rod member. The plunger rod is of smaller diameter than the inside of said tubular portion or is otherwise designed to permit fluid to pass from the upper part of said tubular portion into the cylinder when the plunger rod is forced into the reservoir. The fluid displacement effected by the plunger rod causes the piston and its connected rod member to move upwards relative to the handle, thereby closing the pruning jaws.

Referring to the drawings, a tubular handle 1 of desired length has mounted on or integral with its lower end a fluid cylinder 2. Slidably disposed within that cylinder is a piston 3 provided with a central bore, which is connected to a piston rod member 4 that includes a lower tubular portion 5 and an upper rod portion 6, the latter slidably extending through a collar 7 at the top of the handle.

A clevis member 8 is rigidly mounted on the upper end of rod 6 and secured thereto, for example, with a set screw 9. A pivot bolt 10, passing through the clevis member, pivotally supports two crossed pruning jaws 11. These jaws are provided with opposed, preferably substantially straight cutting edges 12, which form a deep V with a rounded bottom when the jaws are open. Arms 13 at the lower ends of the jaws are in substantial longitudinal alignment with these cutting edges. To the lower end of each arm 13 is connected a bifurcated link 14, by means of a pivot bolt 16. The other end of each link 14 is pivotally secured by bolts 17 to ears 18 on the upper end of the handle adjacent the collar 7. It will be apparent from the structure just described that the jaws will open when rod 6 moves downward relative to the handle 1 and will close when the rod moves in the opposite direction. The jaws are provided with short registering, arcuate slots 19 between pivot bolt 10 and the cutting edges 12. Through these slots passes a bolt 21, which, with washers 22, supplements the clamping action of the clevis member 8 in holding the overlapping faces of the jaws in contact with each other, while still permitting the jaws to pivot freely about bolt 10 through a desired angle.

The top of the handle 1, below the collar 7, may be provided with suitable packing material 23 around the piston rod member 4, to prevent foreign material from entering the top of the handle. The packing material may be retained in place by suitable means, such as a washer 24. At the lower end of the handle, where it joins the top of cylinder 2, an annular collar 26 is secured by screws 27 to the handle and the cylinder. This collar serves as a seat for a coil spring 28, which bears against the top of piston 3 and urges the latter towards its bottom position, in which the cutting jaws are fully open. The bottom of cylinder 2 is closed by a plug 29, which is secured to the handle by screws 31, and sealed by an O-ring 32 around the plug. A similar O-ring seal 33 is provided for piston 3. The space between the lower face of the piston and plug 29, together with the space inside the bore of the piston and inside tube 5, defines a sealed fluid reservoir, which may be filled with hydraulic fluid through the removable filler plug 34 (shown in FIG. 1).

A plunger member or rod 36 extends through a closure plate 37 (bolted to plug 29), a compressible sealing gland 38, and plug 29, so as to pass upwardly through the bore of the piston 3 and into tube 5. The diameter of the plunger member is preferably somewhat less than the inside diameter of the tube, into which the rod can be manually pushed by means of handle 39, which is provided with a cushioning washer 41. On pushing the plunger into tube 5, the fluid therein is displaced and flows around the outside of the rod and through the bore of the piston into cylinder 2, causing the piston to move upward. Such motion, as previously indicated, forces the jaws of the pruning tool to close. The upper end of the plunger 36 may be provided with circumferentially spaced means, such as protuberances 42, which slidably engage the inner wall of tube and keep the rod centered therein while permitting fluid to pass from the tube into the cylinder on the working stroke and to flow in the opposite direction on the return stroke.

It will be apparent that the mechanical advantage of this tool from the hydraulic portion of its structure is equal to the difference in the cross sectional areas of the inside of the cylinder 2 and of the plunger 36. The mechanical advantage of the tool as a whole is determined by multiplying the mechanical advantage of the hydraulic system by that of the lever system comprising the pivoted jaws 11 and links 14.

In the modified form of the invention shown in FIGS.

5-7, which in its general features resembles the tool shown in FIGS. 1-4, the mechanical advantage of the hydraulic system is determined by the same factors that apply to the system just described, only so long as the external force applied by the operator to the plunger does not exceed a predetermined amount. When that level of force is exceeded, however, the mechanical advantage of the hydraulic system is increased. This result is obtained by making the plunger in the form of a sleeve 50 and providing it with a floating piston 51 that is urged against a stop 52 at the inner end of the sleeve by a compression spring 53 that fills the lower part of the sleeve. This spring is designed to exert a predetermined force, for example, 20 pounds, against the floating piston when the latter is against the stop. So long as the opposed fluid pressure does not exceed this predetermined force, as it usually will not in severing small branches and twigs (such a twig A is shown in FIG. 6), the sleeve and floating piston move as a unit and perform the same function in the same way as the solid plunger 36 shown in FIGS. 1-4. When a force greater than the predetermined force is exerted by the fluid on the floating piston, as in cutting heavy branches, the piston tends to move down the sleeve against the urging of the spring when the sleeve is advanced into the cylinder. To prevent the floating piston from moving too far down the sleeve at the beginning of the high force stroke, a restraining cable 54 connects the floating piston to the head 56 of the main piston rod tube 57. The length of this cable is such that it is fully extended and taut when the plunger sleeve is in its lowest position and the floating piston is in its extended position against the stop 52, as shown in FIG. 5. Advancement of the plunger sleeve into the fluid reservoir causes the floating piston to move down the sleeve only to the extent that the sleeve is advanced, the restraining cable holding the piston in the same relative position with respect to the main piston 3 (see FIG. 7, where a heavy branch is represented by B). Accordingly, under conditions of high fluid pressure, the sleeve alone advances into the fluid reservoir (at least, until the pressure of the spring is equal to the opposed fluid pressure, or until the floating piston is bottomed in the sleeve), and the fluid displaced thereby is much less than where the floating piston advances at the same rate as the sleeve (as in FIG. 6). As a result, the effective plunger area is reduced to the annular cross-sectional area of the sleeve itself, and the mechanical advantage of the hydraulic system is greatly increased at the expense of a longer stroke of the plunger. The plunger itself is again supported for maximum stability not only by the plug 29 at the bottom of the handle but also by the engagement of the protuberances 42 with the wall of the piston rod tube 57.

It is among the advantages of this invention that it provides for straight line operation axially of the tool. The operator pushes on the plunger and can utilize his weight not only to advance the plunger, but also to force and hold the branch to be cut at the bottom of the V opening in the jaws where the effective cutting leverage is most favorable. The conventional long-handled shears, in which the crossed jaws are generally integral with the handles and the latter are moved back and forth across the chest of the operator, require unaccustomed arm motions that impose a muscular strain on most persons. Moreover, the back and forth transverse movement of the handles of such conventional shears is a great disadvantage when pruning in thick brush or where the lateral operating space is limited. The pruning tool of this invention, because of its small cross section and straight line operation, can reach and sever branches in a way that is not possible with conventional shears.

Another advantage of the pruning tool of this invention is the excellent balance it affords in the hands of the operator. The portion of the handle that is remote from the operator can be of the utmost slimness, and, therefore, light in weight. Except for the cutting jaws, most of the weight of the tool is at the bottom of the handle, where it is easily controlled. Since the tool is normally supported by one hand grasping the handle near the bottom and the other hand holding the handle of the plunger, the tool is easily balanced without the strain on the wrists exerted by the conventional long-handled pruning shears.

A still further advantage of the present invention resides in its ability to make the most effecitve use of a V-shaped opening of the cutting jaws, in which the cutting edges of the jaws close progressively from the bottom of the V outwards. This shape is the best for maximum cutting effect, so long as the material being cut is not readily squeezed out of the V-opening by the closing of the jaws. With ordinary pruning shears having V-shaped jaws, it is difficult to prevent such "escape," partly because the muscular effort applied to the shear handles is in a direction transverse to the axis of the tool. It is difficult for most people to combine such effort with forward pressure to retain the branch in the cutting jaws. On the other hand, with the tool of this invention, the muscular effort of operating it is applied in a forward axial direction, so that this same effort tends to maintain the branch being cut at the bottom of the V-opening between the cutting jaws. In fact, the V-form of these jaws permits, in many cases, an initial cut to be made merely by pressing the tool against the branch without pushing the plunger. In other words, the cutting edges of the jaws start to incise the side of the branch before pressure is applied to the plunger member. Moreover, with V-shaped cutting jaws, a large branch may be cut partly through by utilizing the cutting edges of the jaws at some distance from the bottom of the V. The jaws can then be again opened, and the cut continued nearer the bottom of the V where the mechanical advantage is greater. In this respect, the V-shaped jaw opening is far superior to one of U-shape, in which the cutting edges close progressively from their outer ends inwards (the reverse of the closing action of the V-shaped jaws). In using the latter, the center of the piece being cut remains at the center of the opening between the closing jaw blades. This point is further from the jaw pivot than the corresponding point, or succession of points, obtained in using the V-shaped opening of the jaws in the pruning tool of this invention. Since this invention utilizes the same applied muscular force both to close the jaws of the tool and to hold the work in the bite of the jaws, it is not necessary to use the less effective jaws having serrated or curved cutting edges, or other forms of grasping blades, to retain the work within the jaws.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Pruning shears comprising a hollow handle, a piston rod member slidably received within the handle and having its upper end extending outside the upper end of the handle and having a tubular lower portion, a pair of crossed cutting jaws pivotally mounted on the upper end of the piston rod member, links connecting the lower ends of the jaws to the top of the handle, a hydraulic cylinder mounted in the lower end of the handle, a hollow piston slidably received within the cylinder and connected to the tubular lower end of the piston rod member, the cylinder and hollow piston and tubular portion of the piston rod member defining a sealed fluid reservoir, a plunger extending through the lower end of the cylinder and into the tubular portion of the piston rod member and of smaller diameter than the latter, whereby advancement of the plunger into the tubular portion of the piston rod member will displace fluid therein to cause the piston and the piston rod member to move upwards relative to the handle to close the pruning jaws.

2. Apparatus according to claim 1, in which the jaws have straight cutting edges that form a V when the jaws are open.

3. Apparatus according to claim 1, in which the inner end of the plunger that is received within the tubular portion of the piston rod member is provided with circumferentially spaced means for centering the plunger member in said tubular portion.

4. Apparatus according to claim 1, in which the jaws are provided with short registering arcuate slots between their cutting edges and their pivotal mounting, and retaining means extending through the slots to maintain the overlapping faces of the jaws in planar engagement against forces tending to separate those faces.

5. Apparatus according to claim 1, in which the plunger is in the form of a sleeve closed at the outer end, a floating piston slidably mounted in the sleeve, a coil spring urging the floating piston towards the inner end of the sleeve, and restraining means for limiting downward movement of the floating piston relative to the piston rod member regardless of the position of the sleeve relative to said member and regardless of the fluid pressure in the reservoir.

6. Apparatus according to claim 5, in which the restraining means includes a flexible line having one end secured to the floating piston and the other end secured to a fixed point on the piston rod member.

7. Apparatus according to claim 5, in which the spring urges the floating piston towards the inner end of the sleeve with a predetermined force that is less than the opposed fluid pressure when the tool is used to cut heavy material.

8. Pruning shears comprising a hollow handle, a piston rod member slidably received within the upper end of the handle, a pair of crossed pruning jaws pivotally mounted on the upper end of the piston rod member, the jaws having straight cutting edges forming a V when the jaws are open and integral arms in substantial longitudinal alignment with the cutting edges, links connecting the arms to the upper end of the handle, a hydraulic cylinder in the lower end of the handle, a piston slidably received within the cylinder and connected to the piston rod member, a plunger slidably received in the lower end of the cylinder and coaxial therewith said plunger being adapted to displace fluid in the cylinder to move the piston upwardly to close the jaws.

No references cited.